US006854398B2

(12) United States Patent
Soldavini et al.

(10) Patent No.: US 6,854,398 B2
(45) Date of Patent: Feb. 15, 2005

(54) METHOD AND APPARATUS FOR TRANSFERRING MECHANICAL ENERGY ONBOARD OF A TRAIN OF CARRIAGES OF A SORTING MACHINE

(75) Inventors: Attilio Soldavini, Ferno Va (IT); Renato Tacchi, Lonate Pozzolo Va (IT); Luciano Longhi, Busto Arsizio Va (IT)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 10/410,250

(22) Filed: Apr. 10, 2003

(65) Prior Publication Data

US 2003/0221938 A1 Dec. 4, 2003

(30) Foreign Application Priority Data

Apr. 12, 2002 (IT) ..................................... MI2002A0786

(51) Int. Cl.⁷ ............................................... B60L 11/00
(52) U.S. Cl. ....................................................... 104/289
(58) Field of Search ................................ 104/118, 287, 104/289; 105/30, 141

(56) References Cited

U.S. PATENT DOCUMENTS

| | | | | |
|---|---|---|---|---|
| 5,115,747 | A | * | 5/1992 | Teissier et al. ................ 105/50 |
| 5,662,045 | A | * | 9/1997 | Miller et al. ................... 105/30 |
| 5,803,230 | A | | 9/1998 | Canziani et al. |
| 5,953,995 | A | | 9/1999 | Saillant |
| 6,209,703 | B1 | | 4/2001 | Soldavini |
| 6,253,904 | B1 | | 7/2001 | Soldavini |
| 6,418,855 | B1 | * | 7/2002 | Fischer ........................ 104/118 |

\* cited by examiner

*Primary Examiner*—S. Joseph Morano
*Assistant Examiner*—Robert J. McCarry, Jr.
(74) *Attorney, Agent, or Firm*—Burns, Doane, Swecker & Mathis, L.L.P.

(57) ABSTRACT

A mechanism for transferring mechanical energy onboard of a train of carriages of a sorting machine includes a friction wheel fitted onto a carriage. The wheel is rotated by friction caused by the engagement of the wheel against a track on which the carriage travels, and is connected to an electric generator disposed on the carriage. Rotation of the wheel is transmitted to the generator to rotate the generator and produce electricity for operating a belt(s) disposed on the carriage. The force with which the wheel is pressed against the track is automatically changed in response to changes in power requirements of the generator.

18 Claims, 5 Drawing Sheets

METHOD AND APPARATUS FOR TRANSFERRING MECHANICAL ENERGY ONBOARD OF A TRAIN OF CARRIAGES OF A SORTING MACHINE

This application claims priority under 35 U.S.C. §119 to Patent Application Serial No. MI2002A 000786 filed in Italy on Apr. 12, 2002.

BACKGROUND OF THE INVENTION

The present invention relates to a device, fitted onto a carriage drafted along a track, adapted to increase the requirement of mechanical energy to the drafting system in order to use such increased energy to transform it into electric energy required to actuate various uses.

The equipment object of the present invention mainly applies to sorting machines of the "Cross belt" type.

These machines can exhibit different layouts (linear, carousel-like, L-shaped, etc.) and they consist of a train of carriages moving along a sorting path, from item input stations to devices for collecting sorted items. See, for example, U.S. Pat. Nos. 5,803,230, No. 6,209,703 and No. 6,253,904, the disclosures of which are incorporated herein by reference.

The term "Cross Belt" indicates that the sorting unit with which the carriage is equipped is a small conveyor belt capable of moving independently, by an electric motor, in the two directions orthogonal to the running direction of the sorting machine.

Such a sorting machine is therefore usually activated during the item loading step to house the same items onboard, and in the unloading step, in one or both directions, to direct the items to the appropriate destination. The energy required to actuate the conveyor belt is provided by an electric motor onboard of each carriage. The present invention involves a device disposed on each carriage adapted to draw mechanical energy from the carriage movement and transfer it onboard of the same carriage, where it is transformed into electric energy to provide for the actuation of conveyor belts onboard the same carriage.

Several methods and devices are known in the prior art, adapted to transfer the electric energy onboard of the train of carriages, required to operate the motors drafting the conveyor belts.

A method for transferring electric energy onboard of the train of carriages consists in a system of busways arranged along the machine and powered by several feeders (typically 70 V 100 A). Onboard of some carriages there are sliding contacts that allow drawing the electric energy that will be transferred to the other carriages by a wiring arranged along the entire train of carriages. Such solution is technically valid and widely tested, but it exhibits some technical disadvantages. In the first place, it is expensive because the busways, which are made of copper, must be arranged perfectly parallel to the machine. Moreover, if they are loose, they vibrate and cause the breaking of the sliding contacts. In turn, also sliding contacts are expensive since they consist of pantographs that are difficult to implement; moreover, contacts are subject to wear and to accidental breakage. Finally, to limit wear, the busways must be oversized to stand high-energy requirements in case of concurrent actuation of several carriages.

Another method consists in the inductive transmission of electric energy. A pair of wires, forming a maxi-turn along the entire machine, forms a closed circuit in which a generator transmits an alternate current of 50–100 A at an approximate frequency of 28 kHz. The current flowing into the two wires generates a concentric magnetic field around the two wires. The E core of transformers installed on the carriages faces the two wires, thereby closing the magnetic circuit. An alternate current is induced through the turns wound on such core, and it can be straightened and used for powering the onboard motor. Such solution is conceptually simple but it exhibits two serious disadvantages; in the first place, high frequencies induce parasitic currents in metal items placed nearby. Therefore, besides the serious attenuation problems, it is necessary to set up suitable protections to prevent potentially hazardous situations for maintenance personnel. In addition, efficiency in the transmission of power peaks is so low that it requires onboard accumulators to deliver strong current peaks, when required.

Another method consists in using the mechanical energy of the carriage drafting system, transferring it onboard each carriage by a pressure wheel fitted on each of said carriages, and converting it into electric energy by a generator actuated by said wheel.

On the average, a machine may require about 3 KW of electric power for loading and sorting, but situations may occur where even 20 KW are required due to the concurrent unloading of several items, by statistic combination. Such disadvantage is solved by equipping each carriage with a battery: the generator, constantly working during the machine movement, charges the battery which therefore, during the travel of the machine, accumulates the energy that will discharge in the few seconds required to load or unload the carriage. In this way, even with a small power generator, it is possible to have the electric power required for loading and unloading operations.

However, such a solution is very complex since, besides the generator, an onboard battery is required and batteries are expensive, polluting, heavy and have a short operating life.

Batteries must be properly protected since they may be dangerous for operators close to the sorting machine, in the event of mechanical jamming caused by the transported items.

Moreover, there is one of such units for each carriage and in addition to the generator and battery, the units also include a controller, which considerably increases costs.

Such disadvantages are overcome by the application of a method and relevant device, which is the object of a commonly owned, concurrently filed U.S. patent application Serial No. 10/410,209 (corresponding to Italian Application Serial No. MI2002A 000785 filed Apr. 12, 2002), to which reference should be made for further details, according to which energy is not stored in the batteries as electric energy, but rather in the moving train of carriages, that is, using the high capacity of storage of mechanical energy of the same machine through its kinetic energy.

Since with the application of such method the instantaneous powers needed to transfer items onboard of the carriages can be very high, the drafted wheels must be strongly compressed against the track to prevent frictional sliding of the wheels, but this highly stresses the mechanical members.

Moreover, the prior art that provides for the use of a toothed wheel engaging a rack is expensive and causes excessive noise.

SUMMARY OF THE INVENTION

The present invention aims at overcoming the above disadvantages by a device wherein the load acting on the members is only that required and not constantly the maximum value, there being provided means adapted to increase the load on the wheel based on the instantaneous electric power required by the unloading system.

Moreover, the device according to the invention is also capable of limiting the increase of load applied to the wheel, there being provided means adapted to deactivate the mechanism that produces the load increase, when energy requirements exceed a fixed limit.

BRIEF DESCRIPTION OF THE DRAWINGS

The invention is described hereinafter with reference to the attached figures, wherein.

DESCRIPTION OF PREFERRED EMBODIMENTS OF THE INVENTION

Figure 1A:
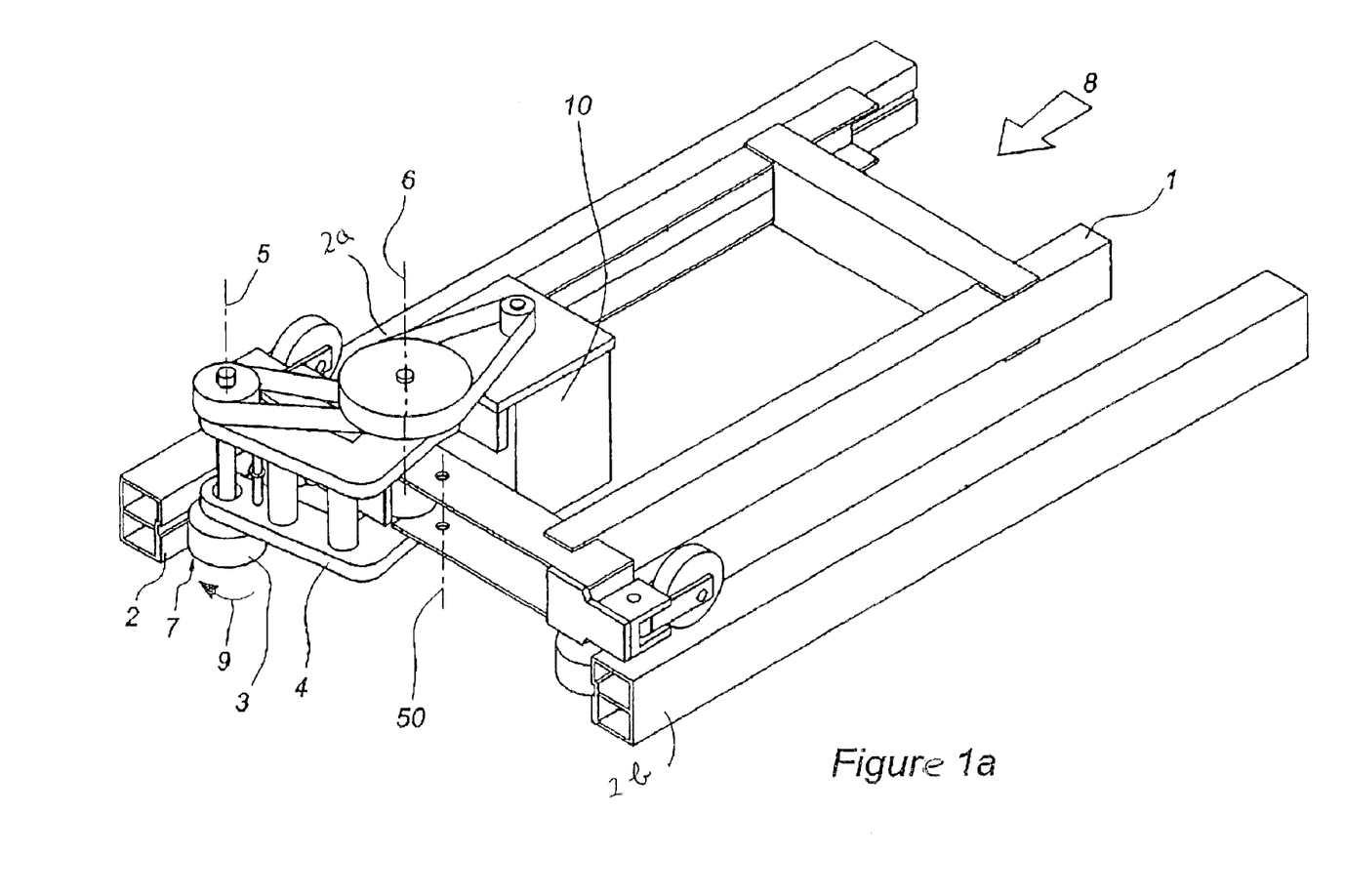
FIG. 1a shows a front top perspective view of a main part of a carriage (without cross-belts) carriage provided with the energy transfer device according to the invention.
Figure 1B:
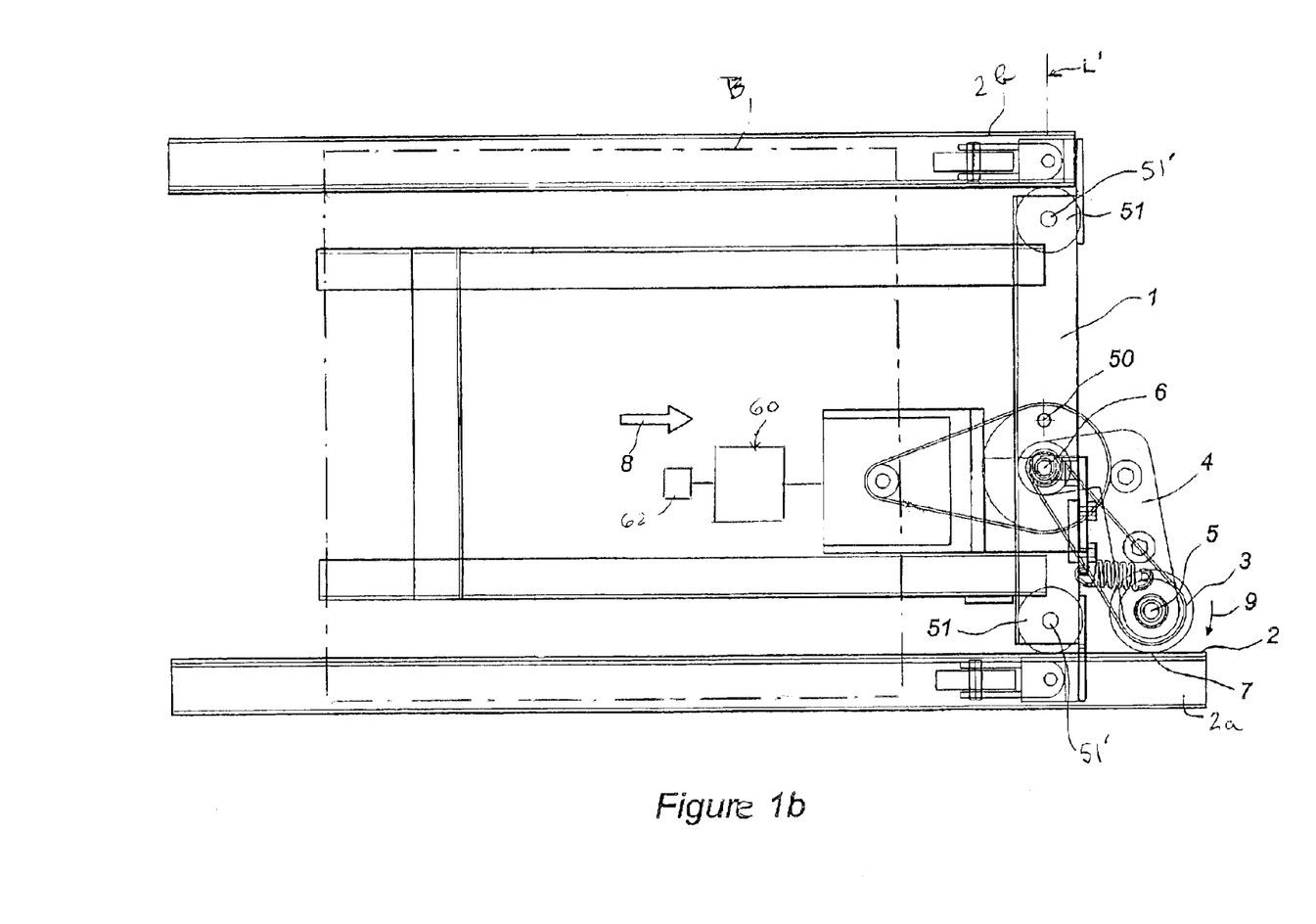
FIG. 1b shows a plan view of the carriage of FIG. 1a with a first embodiment of an energy transfer mechanism according to the invention.

With reference to FIGS. 1a, 1b, reference numeral (1) denotes a carriage sliding on a track (2), formed by two parallel rails (2a, 2b), whereas reference numeral (3) denotes a friction wheel supported by an arm (4) and rotating relative to said arm (4) about an axis (5) defined by a shaft (5A). Said arm (4) is articulated to carriage (1) for rotation about an axis (6) and said wheel (3) is in contact with one rail (2a) of said track (2) at a point (7). Carriage (1) moves along the track (2) in the direction indicated by arrow (8) and places the wheel (3) in rotation in the direction shown by arrow (9) by effect of the friction existing between said wheel (3) and said track (2). The sorting machine would carry a small conveyor belt B that is electrically driven in either of two opposite directions disposed perpendicular to the direction of travel of the carriage. The belt and its drive mechanism are well known in the art.

A first preferred embodiment of a device according to the invention is now shown by way of an illustrative and non-limiting example, said device being adapted to draw mechanical power from the wheel (3) placed in rotation by effect of the friction with the track (2), there being provided means adapted to increase the pressure on the drafted wheel (3) based on the electric power required by the loading-unloading system, starting from a low pre-load, and means adapted to prevent such load on the wheel from increasing above a fixed limit.

Figure 2:
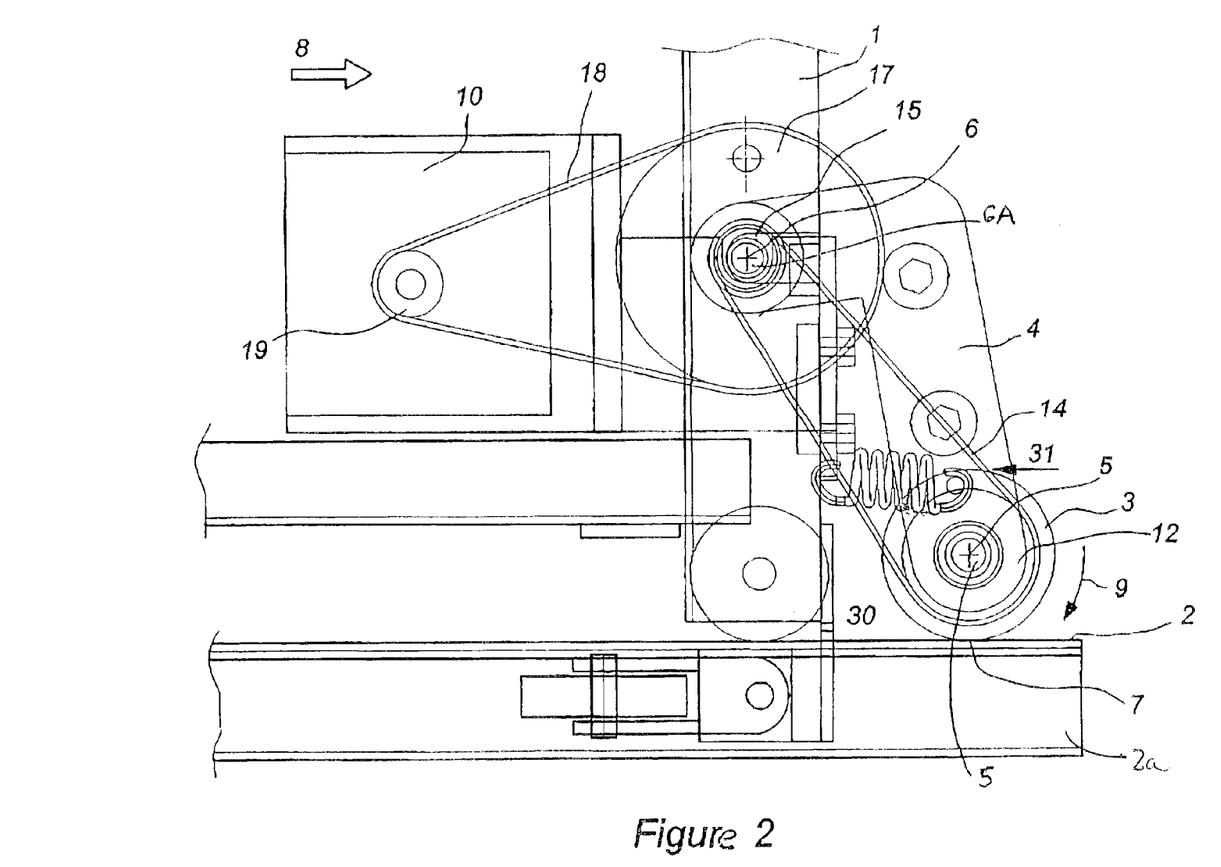
FIG. 2 shows an enlargement of part of FIG. 1b.

With reference to FIG. 2, carriage (1) carries a generator (10). The axis (6) about which said arm (4) supporting said wheel (3) is articulated, is defined by a shaft (6A) mounted on the carriage (1).

The transmission of motion from the wheel (3) to the generator (10) occurs by means of: a first pulley (12) coaxial with wheel (3), a first driving belt (14) connecting said first pulley (12) with a second pulley (15) rotating on said shaft (6A), said second pulley (15) being integral and coaxial with a third pulley (17), which in turn is connected, by a second driving belt (18), with a fourth pulley (19) that is integral with an input shaft of the generator (10). The generator (10) is connected to a control system (60) of the sorting machine to provide electrical energy thereto.

Said arm (4) is subject to the action of a spring (30) exerting a pulling action in the direction shown by the arrow (31) in FIG. 2. The effect of such pulling action is that of compressing the wheel (3) against the track (2) so as to generate the friction force which, in combination with the movement of the carriage along the track, causes the wheel (3) rotation.

To better understand the mechanism according to which the device according to the invention can adjust to power requirements by the unloading system, reference will be made to the simplified diagram of FIG. 3.

If a braking torque $C_r$ is applied to wheel (3) in the direction shown by arrow (55) by the reaction of the generator (10) to the power requirements imposed thereon by the loading/unloading operations, a braking force $F=C_r/r$ will be generated at the point of contact (7) between the wheel and the track, with "r" being the radius of the wheel (3). The letters "a" and "b" represent respectively the lengths of the moment arms of forces $F_n$ and F relative to the axis (6). With the symbol "*" representing a multiplication sign, it will be apparent that the momentum balance relative to said axis (6) is:

$$F*b=F_n*a$$

from which:

$$F_n=F*(b/a).$$

With "tg" meaning tangent, and with α being an angle formed between the track and a line L extending between the axis (6) and the point of contact (7), it will be appreciated that the ratio b/a is equal to tg α, so:

$$F_n=F*tg\ \alpha=C_r/r*tg\ \alpha$$

That is, the vertical reaction $F_n$ is proportional to the braking torque and to angle α. It can also be noted that:

$$tg\ \alpha=F_n/F_1$$

so the wheel non-sliding condition therefore is:

$$F<F_n*f$$

That is, there is no sliding between wheel (3) and track (2) (i.e., only rotation of the wheel) when the braking force is less than the radial load applied on the wheel multiplied by the friction coefficient f. At this point, using the previous relation between F and $F_n$ the non-sliding condition can be translated as follows;

$$F/F_n<f$$

That is:

$$1/tg\ \alpha<f$$

From the previous relation it can be seen that, for an assigned friction coefficient f, the non-sliding condition can be simply obtained by selecting a suitable value of angle α which, since it does not depend on the resistant torque Cr, it does not even depend on the power drawn.

Figure 3:
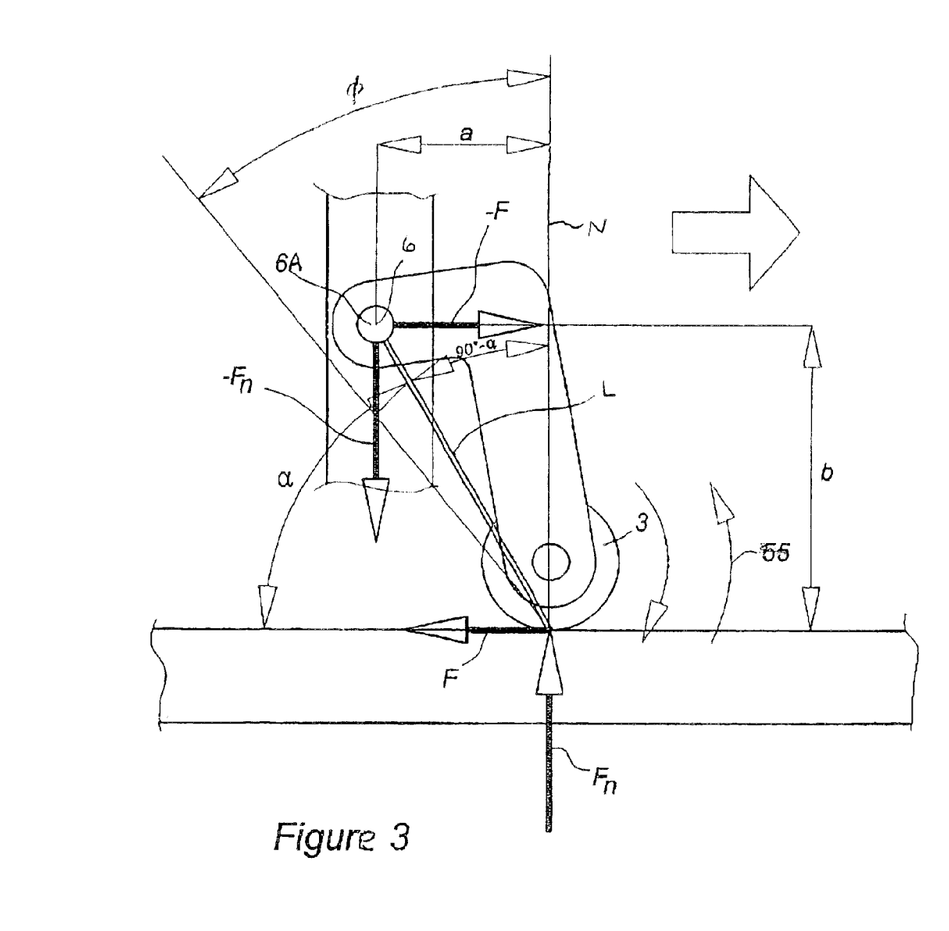
FIG. 3 shows a diagram of the device of FIG. 2 indicating the forces interacting between the device itself and the track.

In other words, the following two characteristics are required to avoid sliding of the wheel (3) relative to track (2):

the line (L) which joins the axis (6) and the point (7) in FIG. 3 must be inclined compared to a normal (N) to the track by an angle 90°−α which is smaller than the reciprocal friction angle φ of the materials forming the wheel and the track.

the contact point (7) between wheel and track must be ahead of the axis (6) in the direction of movement of the carriage.

In the practical case of f=0.5 (typical friction of a polyurethane wheel on aluminum), the previous non-sliding, condition requires:

$$\alpha >= \arctan(1/f) = 64°$$

Therefore, in the system of FIG. 3, the radial force $F_n$ on the wheel increases proportionally to the braking torque. Therefore, the non-sliding condition will always be checked for f=0.5 and α>64°. That is, under those conditions, regardless of how much electric power is required during operation, a suitable loading condition would be automatically created on the wheel to prevent it from sliding.

Since the force exchanged between the wheel and the track is proportional to the resistant torque due to the generator, it is sufficient, in order to limit the stress imposed on the mechanical member, for the control system (60) of the machine to include a power manager (62) which manages the operation of the unloading system so as to keep the electric power requirement below a fixed limit. Thus, the force with which the wheel is pressed against the track would not exceed a predetermined value.

In the improbable case (due to the high reliability) of failure of the control system, it is advantageously possible to add an element adapted to yield before the stress damages the mechanical members.

Said element adapted to yield for a fixed loading value may be, by way of a non-limiting example, the shaft (6A) or the shaft (5A).

A second preferred embodiment of the device according to the invention is now shown, wherein the limitation of the stress on mechanical members is intrinsically obtained by the mechanical device itself, without the need of any action by a power manager of the electronic control system.

Figure 4:
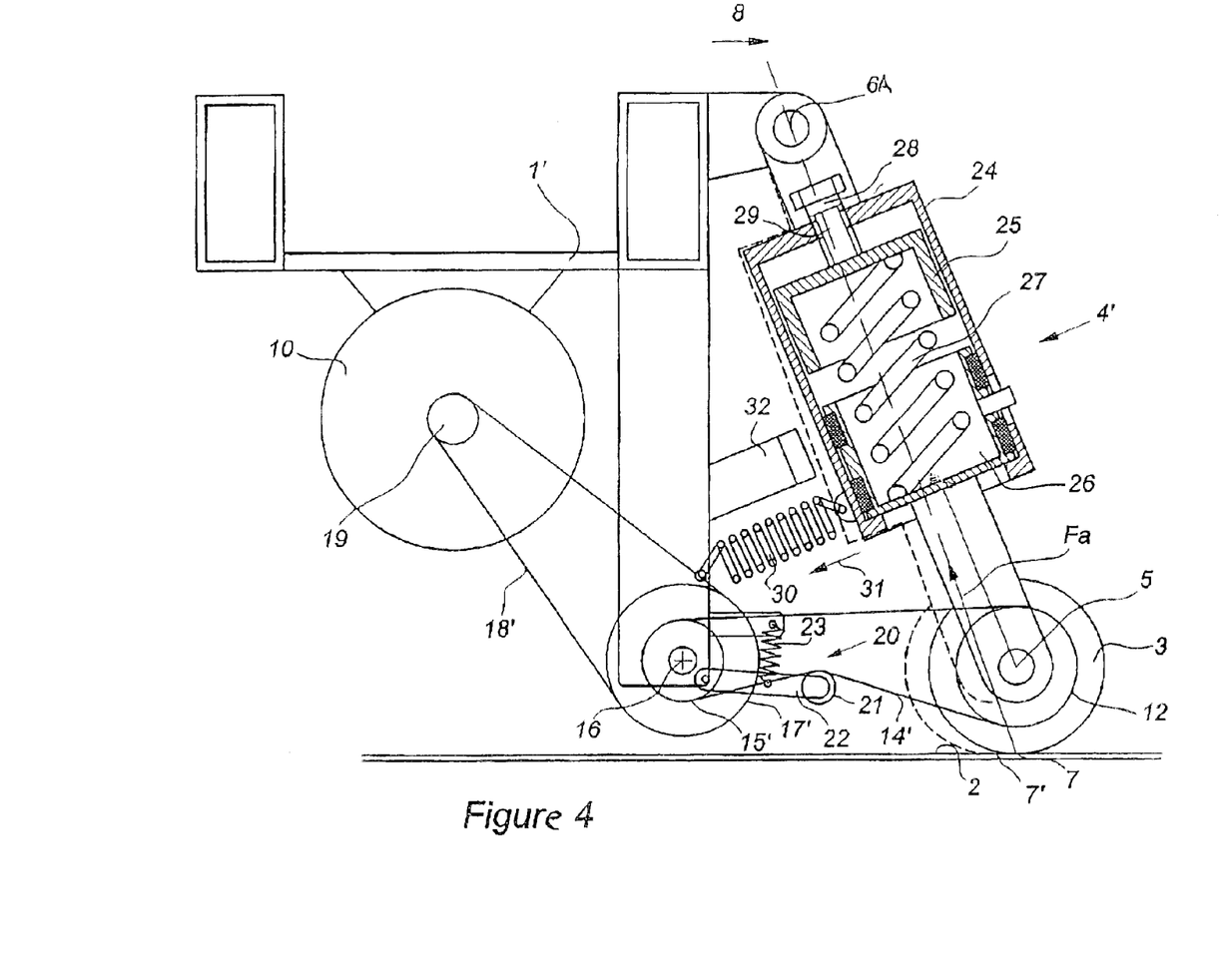
FIG. 4 shows a second preferred embodiment of an energy transfer mechanism.

With reference to FIG. 4, reference numeral (1') denotes a structure integral with the carriage (1) adapted to support the generator (10) and the shaft (6A) to which an arm (4') is articulated which, as in the case of the arm (4) of the first embodiment shown in FIG. 2, has the function of supporting the wheel (3) but which, in this second embodiment, includes force-limiting means adapted to limit the forces exchanged between wheel (3) and track (2) against which said wheel slides.

The transmission of motion from the wheel (3) to the generator (11) occurs by a first pulley (12) oriented coaxial with wheel (3), and a first driving belt (14') connecting said first pulley (12) to a second pulley (15') rotating about an axis (16) integral with structure (1'). The second pulley (15') is integral and coaxial with a third pulley (17') which, in turn, is connected by a second driving belt (18') with a fourth pulley (19) integral with the input shaft of generator (10).

Since the distance between the axes (5) and 16 about which pulleys (12) and (15) rotate is subject to variations due to the rotation of arm (4') around pivot (6), known means (20) are provided, adapted to keep said belt (14) tensioned, comprising for example a guide pulley (21) pressing against a branch of the belt (14), the guide pulley (21) being fitted onto a lever (22) that is subject to the action of a spring (23).

Said oscillating arm (4') comprises a cylinder (24) in which there are two axially sliding, opposed cups (25) and (26) enclosing a helical spring (27) which tends to reciprocally separate them. Said cup (26) is, in rest conditions, in abutment against a travel end consisting of the lower edge of cylinder (24), whereas said cup (25) is subject to the axial action of conventional means adapted to adjust the position of said cup (25) within said cylinder (24), said adjustment allowing the thrust of spring (27) against the cup (26) to be calibrated.

Said conventional means could comprise, for example, a set screw (28) engaging into a threading (29) formed in the upper portion of the cylinder (24) and which presses against the cup (25) to pre-load the spring (27).

As long as the component $F_a$ along the axis of the spring (27) of the resulting of the contact forces F and $F_n$ between wheel and track is less than the compressive pre-load of the spring (27) imparted by the set screw (29), the arm (4') acts as if it were stiff. When said component $F_a$ exceeds the value of said pre-load, the cup (26) retracts, further compressing said spring (27), whereupon the distance between axes (5) and (6) decreases and arm (4') starts rotating until it stops against an abutment (32) integral with structure (1'). During this movement, the point of contact (7) between wheel and track moves to point (7').

When arm (4') is stopped by the abutment (32), the spring (27) cannot be compressed anymore and the force exchanged between track and wheel cannot therefore increase anymore.

Of course, the consequence is that a further increase of the electric power required, due for example to a simultaneous unloading of a high number of carriages, cannot be met and the machine will have to manage this situation by delaying the unload of one or more carriages to the next round.

According to the preferred embodiment of FIG. 1, the wheel (3) has a vertical axis but it may instead have a horizontal axis, always oriented perpendicular to the carriage running direction, and in engagement with the top (or bottom) surface of the track. Such a wheel with horizontal axis would be moved down (or up) to increase the frictional force against the track However, a problem of irregular operation may occur in the track transition zones, that is, in non-rectilinear portions of the carriage path. Such a problem occurs in the case the wheel (9) rotation axis changes direction, so in case of changes of the slope of the axis, if the wheel (9) axis is vertical as the carriage travels along an incline or decline. If the wheel (9) axis is horizontal the problem occurs as the carriage traverses a curve. The preference for wheels with a vertical axis is due to the fact that curves are always present in sorting machines, whereas slope changes are relatively less frequent.

In the described case of a drive with a vertical-axis wheel, in track portions with a slope change, the wheel is subject to a rotational translation, and thereby to an unavoidable sliding condition.

On the other hand, such irregularity would occur in a curve in case of a horizontal wheel (9) axis.

For the drive in a curve to be fully efficient, the axis (6) must coincide with the axis (50) (FIGS. 1a, 1b) of the articulation joint between the carriage (1) and the preceding carriage, or it must at least be at a distance from it which should be less than ¼ of the distance between the axis (6) and the rail (2a), but remaining on a straight line (L') passing through the axis (6) and the axis (51') of the side contrast wheels (51).

In fact it has been proved that passing from the rectilinear path to the curves, in the two directions, the angle α remains constant.

With the configuration shown in FIGS. 1a, 1b, the variations of angle α remain at approximately 1°.

In this way, the relation that ensures the increase of the radial load on the wheel with the resistant torque is maintained also in a curve, without the occurrence of sliding conditions.

The advantages of the device according to the invention are as follows:
- it is intrinsically free from sliding problems since the contact force automatically increases as a consequence of an increased electric energy requirement by the loading system,
- it is intrinsically capable of limiting the forces exchanged between carriage and track when electric energy requirements by the unloading system decrease, with the consequent advantage of a longer life of mechanical members,
- it never exceeds a fixed value of maximum stress of the mechanical members.

Although the present invention has been described in connection with preferred embodiments thereof, it will be appreciated by those skilled in the art that additions, modifications, substitutions and deletions not specifically described may be made without departing from the spirit and scope of the invention as defined in the appended claims.

What is claimed is:

1. A sorting machine comprising:
   a track;
   a carriage mounted for movement along the track for carrying items to be sorted;
   an electric generator disposed on the carriage; and
   an energy transfer mechanism disposed on the carriage for transferring mechanical energy comprising:
      a friction wheel mounted on the carriage and pressed against the track to be rotated by friction between the wheel and the track,
      a drive transmission between the wheel and the generator for transferring rotary energy from the wheel to the electric generator, and
      force-varying means for causing a force with which the wheel is pressed against the track to be varied in accordance with changes in an electric power requirement of the generator.

2. The sorting machine according to claim 1 wherein the force-varying means includes force-limiting means for preventing the force with which the wheel is pressed against the track from exceeding a predetermined value.

3. The sorting machine according to claim 2, wherein the force-varying means comprises an arm having a first end pivotably mounted to the carriage for pivotal movement about an axis, the wheel being mounted at a second end of the arm and engaging the track at a point of contact situated forwardly of the axis with reference to a direction of travel of the carriage.

4. The sorting machine according to claim 3 wherein the axis and the point of contact are arranged wherein a first imaginary line passing through the axis and the point of contact forms a first angle with a second imaginary line extending orthogonally relative to the direction of carriage travel, the first angle being smaller than a reciprocal friction angle resulting from the type of materials forming the wheel and the track.

5. The sorting machine according to claim 2 further including a control system for controlling operation of the sorting machine, the force limiting means comprising an energy manager connected to the control system.

6. The sorting machine according to claim 5 wherein a portion of the energy transfer mechanism is arranged to yield in response to a mechanical overload thereof.

7. The sorting machine according to claim 1 wherein the carriage constitutes a first carriage, and the axis constitutes a first axis which is vertically oriented, the sorting machine further including a pair of side contrast wheels mounted on the carriage for rotation about respective second axes which are vertically oriented, the contrast wheels engaging respective portions of the track; a second carriage disposed ahead of the first carriage and connected to the first carriage by a pivot defining a third axis which is vertically oriented; wherein the first axis lies on an imaginary line extending through the second axis and the third axis, the first axis spaced from the third axis by a distance less than ¼ of a distance between the third axis and a rail of the track engaged by the friction wheel.

8. A sorting machine comprising:
   a track;
   a carriage mounted for movement along the track for carrying items to be sorted;
   an electric generator disposed on the carriage; and
   an energy transfer mechanism disposed on the carriage for transferring mechanical energy comprising:
      a friction wheel mounted on the carriage and pressed against the track to be rotated by friction between the wheel and the track,
      a drive transmission between the wheel and the generator for transferring rotary energy from the wheel to the electric generator, and
      an arm having a first end pivotably mounted to the carriage for pivotal movement about an axis, the wheel being mounted at a second end of the arm engaging the track at a point of contact situated forwardly of the axis with reference to a direction of travel of the carriage for causing a force with which the wheel is pressed against the track to be varied in accordance with changes in an electric power requirement of the generator.

9. The sorting machine according to claim 8 wherein the arm comprises a first portion forming the first end, and a second portion forming the second end, the second portion being movable relative to the first portion toward the first end against a spring bias in response to increased energy requirements of the generator, wherein the arm swings about the axis opposite the direction of carriage travel.

10. The sorting machine according to claim 9 further including an abutment fixed to the carriage and arranged to be abutted by the arm during swinging movement thereof opposite the direction of carriage travel, to prevent the force with which the wheel is pressed against the track from exceeding a predetermined value.

11. The sorting machine according to claim 10 wherein the first portion of the arm comprises a cylinder in which the second portion of the arm is slidable, the spring bias is created by a coil compression spring disposed within the cylinder.

12. The sorting machine according to claim 11 further including an adjuster for adjusting a compressive pre-load of the spring.

13. The sorting machine according to claim 12 wherein the adjuster comprises a cup receiving an end of the spring and slidably mounted within the cylinder between the spring and an end wall of the first portion of the arm, and a set screw threadedly mounted in the end wall for changing a position of the cup relative to the cylinder.

14. The sorting mechanism according to claim 8 further including a spring connected to the arm and the carriage for biasing the arm in a direction pressing the wheel against the track.

15. A method of operating a sorting machine, comprising the steps of:
- A) advancing the sorting machine along a track,
- B) pressing a friction wheel carried by a carriage of the sorting machine against a rail of the track to cause the friction wheel to rotate by friction with the rail,
- C) transmitting rotary motion of the wheel to an electric generator to cause the generator to generate electricity, and
- D) arranging the friction wheel on the carriage so that the force pressing the friction wheel against the rail is varied in accordance with changes in power requirements of the generator.

16. The method according to claim 15, further including the step D of preventing the force from exceeding a pre-set value.

17. The method according to claim 16 wherein step D comprises limiting the power requirements of the generator.

18. The method according to claim 16 wherein step D comprises limiting the extent of movement of an arm on which the friction wheel is mounted.

* * * * *